(12) United States Patent
Guo et al.

(10) Patent No.: US 8,359,632 B2
(45) Date of Patent: Jan. 22, 2013

(54) CENTRALIZED ACCOUNT REPUTATION

(75) Inventors: Wei-Qiang Guo, Bellevue, WA (US);
Vaishali De, Seattle, WA (US); Rui Chen, Kirkland, WA (US); Geoffrey John Hulten, Lynnwood, WA (US); Lin Huang, Redmond, WA (US); Vikas Rajvanshy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 12/130,555

(22) Filed: May 30, 2008

(65) Prior Publication Data

US 2009/0300720 A1 Dec. 3, 2009

(51) Int. Cl.
*H04L 29/06* (2006.01)
(52) U.S. Cl. .......................................... 726/3
(58) Field of Classification Search .................. 726/3
See application file for complete search history.

(56) References Cited

U.S. PATENT DOCUMENTS

| | | | |
|---|---|---|---|
| 2002/0103801 A1 | 8/2002 | Lyons et al. | |
| 2004/0083389 A1 | 4/2004 | Yoshida | |
| 2004/0122926 A1* | 6/2004 | Moore et al. | 709/223 |
| 2006/0277259 A1 | 12/2006 | Murphy et al. | |
| 2007/0078699 A1* | 4/2007 | Scott et al. | 705/10 |
| 2007/0086592 A1 | 4/2007 | Ellison et al. | |
| 2007/0124388 A1* | 5/2007 | Thomas | 709/206 |
| 2007/0130351 A1* | 6/2007 | Alperovitch et al. | 709/229 |
| 2007/0162587 A1 | 7/2007 | Lund et al. | |
| 2007/0192169 A1 | 8/2007 | Herbrich et al. | |
| 2007/0199070 A1 | 8/2007 | Hughes | |
| 2007/0203852 A1* | 8/2007 | Cameron et al. | 705/75 |
| 2007/0214506 A1* | 9/2007 | Rao et al. | 726/25 |
| 2007/0236453 A1* | 10/2007 | Maynard et al. | 345/158 |
| 2007/0282832 A1 | 12/2007 | Herley et al. | |
| 2008/0109491 A1 | 5/2008 | Gupta | |

OTHER PUBLICATIONS

Yang, et al., "A Multi-dimensional Reputation System Combined with Trust and Incentive Mechanisms in P2P File Sharing Systems", International Conference on Distributed Computing Systems Workshops, 2007. ICDCSW apos 07. Jun. 22-29, 2007. 6 Pages.

Guedes, et al., "A Reputation Model Based on Testimonies", Proceedings of Workshop on Agent-Oriented Information, 2006. 14 Pages.

Huynh, et al., "An integrated trust and reputation model for open multi-agent systems", Auton Agent Multi-Agent Sys (2006) 13: 119-154.

(Continued)

*Primary Examiner* — Jason Gee
(74) *Attorney, Agent, or Firm* — Wolfe-SBMC (57) ABSTRACT

A centralized account reputation system differentiates between illegitimate users and legitimate users using reputation scores associated with the users' online accounts. The system restricts the access of illegitimate users to certain network services while minimizing its negative effects on legitimate users. The system can manage the life cycle of an online account, considering data about the account that is obtained throughout the account network to compute the online account reputation score and allocating access to network services based on the online account reputation score. For example, a reputation score may be embedded in a security token that can be accessed by multiple services on the account network, so that each service can determine the appropriate level of access to be granted to the associated user account based on the reputation score. Various types of online account behavior over time can improve or diminish the online account's reputation.

19 Claims, 5 Drawing Sheets

OTHER PUBLICATIONS

Silaghi, et al., "Reputation-based trust management systems and their applicability to grids", CoreGRID Technical Report No. TR-0064. Feb. 23, 2007. 26 Pages.
Windley, et al., "Using Reputation to Augment Explicit Authorization", DIM'07, Nov. 2, 2007, Fairfax, Virginia, USA. pp. 72-81.
International Search Report and Written Opinion Received for PCT Application No. PCT/US2009/042396, mailed on Dec. 30, 2009, 14 pages.
"Foreign Office Action", Chinese Application 200980120880.3, (Nov. 2, 2012), 12 pages.

* cited by examiner

CENTRALIZED ACCOUNT REPUTATION

BACKGROUND

Spamming refers to abuse of electronic messaging systems to indiscriminately send unsolicited messages, typically in large volumes. Spamming primarily occurs via email, although other spamming channels may include instant messaging, text messaging, photosharing services, newsgroups/electronic bulletin boards, blogging services, web search engines, junk fax transmissions, etc. Spamming is illegal in some jurisdictions and is considered undesirable by most commercial enterprises and users. However, spamming continues to comprise the majority of electronic message traffic, particularly email traffic.

Commercial enterprises running electronic messaging systems typically wish to discourage the use of their systems to originate or receive spam, in part because spam can consume large amounts of system resources and because the enterprises do not wish to assist spammers in such undesirable and unpopular behavior. In addition, the enterprise generally wishes to protect its legitimate users from spammers. Accordingly, enterprises typically promulgate rules against such system abuse. However, because many commercial electronic messaging systems are free consumer services, they still attract those illegitimate, rule-breaking users who abuse the systems for economic gain, in addition to legitimate, rule abiding users.

The commercial enterprises running electronic messaging systems also may implement security measures to combat spammers, such as identifying illegitimate users and shutting down their online accounts, collecting complaints about spam from recipients to identify illegitimate users, and providing spam filtering services. Nevertheless, spammers continue to attack and may eventually overcome these security measures.

SUMMARY

Implementations described and claimed herein address the foregoing problem by providing a mechanism for differentiating between illegitimate (e.g., rule-breaking, abusive, spamming) users and legitimate (e.g., rule-abiding) users using a reputation score associated with the user's online account. A centralized account reputation system restricts the access of users predicted to be illegitimate to certain network services while minimizing its negative effects on users predicted to be legitimate. Further, the centralized account reputation system can manage the life cycle of an online account, typically starting from the time of account creation through account termination. The system can consider feedback obtained throughout the account network to compute the account reputation score and allocate access to network services based on the account reputation score. In one implementation, the reputation score is embedded in a security token that can be accessed by multiple services on the account network, so that each network service can determine the appropriate level of access to be granted to the associated user account based on the reputation score. Various types of account behavior over time can improve or diminish the account's reputation. Furthermore, different levels of reputation can translate into difference levels of access to the services provided within the account network.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

A centralized account reputation system differentiates between illegitimate users and legitimate users, identifying illegitimate users and restricting their access to certain network services while minimizing the system's negative effects on legitimate users. Further, the centralized account reputation system can manage the life cycle of an online account, typically starting from the time of account creation through account termination. The system can consider feedback obtained throughout account network to compute the account reputation score and allocate access to network services based on the account reputation score. In one implementation, the reputation score is embedded in a security token that can be accessed by multiple services on the account network, so that each network service can determine the appropriate level of access to be granted to the associated user account based on the reputation score. Various types of account behavior over time can improve or diminish the account's reputation. Furthermore, different levels of reputation can translate into difference levels of access to the services provided within the account network.

Figure 1:
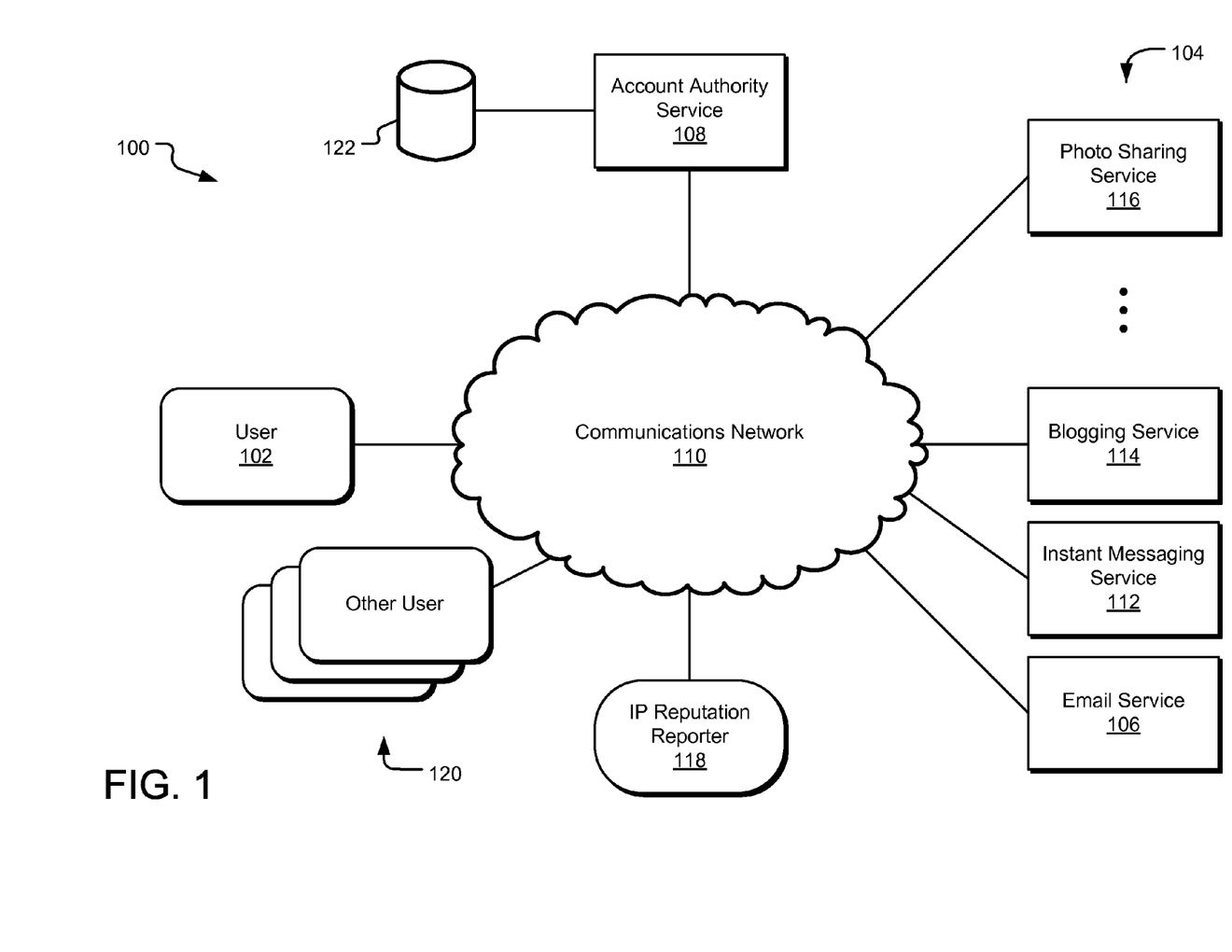
FIG. 1 illustrates an example centralized account reputation system.

FIG. 1 illustrates an example centralized account reputation system 100. A user 102 attempts to access one of the network services 104 (e.g., the email service 106) via a communications network 110 using the user's online account, which is managed by the account authority service 108. (It should be understood that online accounts may also be attributed to devices in much the same way as with users, and a device's online account may be assigned a reputation score accordingly.) Other example network services may include an instant messaging service 112, a blogging service 114, a photosharing service 116, and other network services, whether provided by the same enterprise that provides the account authority service 108 or by some other enterprise. The user's access request is redirected to the account authority service 108, which prompts the user 102 to login to his or her online account.

In one implementation, the account authority service 108 provides the user with a security token upon a successful login. The security token includes a reputation score associated with the user's online account. The user's computing device then sends the security token with the reputation score to the email service 106 to access features of the email service 106 (e.g., sending email messages, reviewing email messages, changing user profile information and preferences, etc.).

Based on the reputation score, the email service 106 determines a level of access that it will grant to the user. For example, an online account with a low reputation score may be considered a possible illegitimate user (e.g., a spammer). As such, the email service 106 may limit the number of email messages the online account may send in a particular period of time, thereby making spamming behavior more difficult for that online account. (In some circumstances, sending large numbers of emails may be considered a characteristic of illegitimate use.) In contrast, an online account with a high reputation score may be considered a likely legitimate user. As such, the email service 106 may allow the user to send unlimited messages in a particular period of time. Accordingly, an online account's reputation score can influence the level of access the online account has to features of a particular network service.

The reputation score may be computed (e.g., by the account authority service 108 or some other reputation authority) based on a variety of behavior metrics, including metrics relating to validation operations, user-to-service behavior metrics, user-to-user behavior metrics, and metrics provided by reputation reporters. For example, in one implementation, the user may be required to validate himself or herself to the account authority service 108 by responding to a validation prompt, such as by solving a human interactive proof (HIP), sending a Short Message Service (SMS) validation message from his or her computing device, providing a device ID from his or her computing device to indicate that the device is trusted, etc. Such validation metrics can increase the system's confidence that the user's online account is legitimate and not attributed to an unmanned Internet "bot" that sets up online accounts for spammers, for example.

Furthermore, the network services accessed by an online account can provide feedback to the account authority service 108 to influence the online account's reputation score. Such feedback can relate to account behavior within the network service, account data provided by the user to the network service, or other metrics that can be monitored by the network service. For example, the email service 106 may treat sending fewer than ten email messages a day as positive behavior that is unlikely to be performed by an illegitimate online account (e.g., of a spammer). The email service 106 may also consider that an online account performing such positive behavior over a period of months as an even more positive sign that the online account is likely to be a legitimate online account. Accordingly, the email service 106 can report its estimation of the online account's reputation to the account authority service 108 based on such factors. The overall reputation score computed for and attributed to the online account can then reflect the contribution of the network service's estimation of the online account's reputation. It should be understood that the feedback about an online account that is received from network services can change over time. Accordingly, the reputation score can change to reflect changes in the online account's feedback from other services and therefore in the estimation of the online account's reputation.

In another implementation, the reputation score may be computed based on feedback received from other users about the behavior of the online account. For example, users 120 may report receiving spam from an email address associated with the online account and report this "bad" behavior to the account authority 108 or other reputation reporter. In one implementation, negative feedback about an online account can lower the online account's reputation score, and positive feedback about the online account can increase its reputation score. An online account's feedback from other users may also change over time, whether improving, diminishing, or both. Therefore, the account authority service 108 may weigh older feedback from other users differently (e.g., less) than newer feedback. Accordingly, the reputation score can change to reflect changes in the online account's feedback from other users and therefore in the estimation of the online account's reputation.

Other reputation reporters, such as an IP (Internet Protocol) reputation reporter 118, can provide feedback on an online account. For example, the IP reputation reporter 118 can report periodically updated "whitelists" and/or 'blacklists' of IP addresses that have been determined by various techniques. Credit reports, public records, and other sources of information may be used by such reputation reporters and fed back as metrics associated with the user's online account to the account authority service 108. For example, if the user provides verifiable information that can be validated by a report from a credit bureau, Secretary of State filing, etc., the reputation system may indicate a higher confidence in the legitimacy of the online account. It should be understood that the feedback about an online account that is received from reputation reporters can change over time. Accordingly, the reputation score can change to reflect changes in the online account's feedback from reputation reporters and therefore in its estimation of the online account's reputation.

In one implementation, the feedback received the various feedback sources may be collected and stored in a datastore 122 accessible by the account authority service 108. The feedback may be accessed by the account authority service 108 for reputation score computation or communicated to another reputation score computation service. The resulting reputation score may also be stored in the datastore 122 to be available for inclusion in a security token responsive to online account login or the reputation score may be computed and communicated directly into a security token in real time, bypassing storage in the datastore 122.

In other implementations, the reputation score may be provided to the network service in forms other than in the security token. For example, the account authority service can transmit the reputation score, along with details about data that fed into the computation of the reputation score, to the network service via a SOAP interface.

Figure 2:
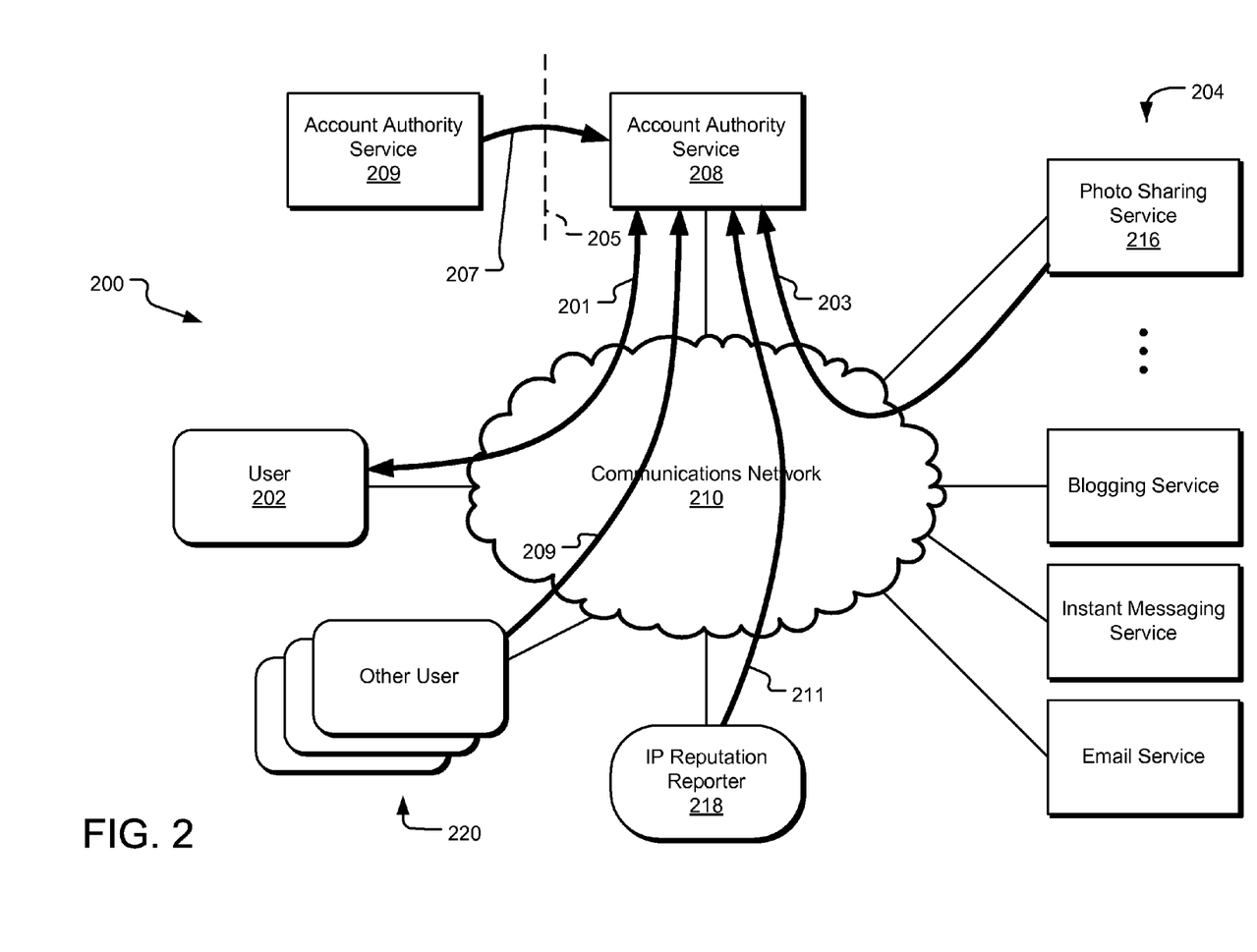
FIG. 2 illustrates an example centralized account reputation system collecting feedback for use in computing a reputation score of an online account.

FIG. 2 illustrates an example centralized account reputation system 200 collecting feedback for use in computing a reputation score of an online account. As an initial matter, the action 201 of setting up an online account for a user 202 initializes the online account's reputation score. (It should be understood that online accounts may also be attributed to devices in much the same way as with users, and a device's online account may be assigned a reputation score accordingly.) In one implementation, an online account's initial reputation score may be neutral (e.g., 0 on a scale of −128 to 127), however an account authority service 208 may alternatively start with a more positive or more negative view of new online accounts, depending on the security concerns and services of the network. For example, if the user provides more than a minimal amount of information at online account setup (e.g., a Federal Employer Identification Number), the online account's initial reputation score may be enhanced above a neutral score. In contrast, if the user provides information that is inconsistent with a legitimate user (e.g., an invalid email address), then the initial reputation score may be reduced below neutral.

When user attempts to login to an online account, attempts to access a network service, and/or at various times during network service access, the user may be prompted to validate his or her online account. For example, in one implementation, the user may be required to validate himself or herself to the account authority service 208 by solving a human interactive proof (HIP), sending a Short Message Service (SMS) validation message from his or her computing device, providing a device ID from his or her computing device to indicate that the device is trusted, etc. Failure to successfully validate can reduce an online account's reputation. However, successful validation can increase the system's confidence that the user's online account is legitimate and not attributed to an unmanned Internet "bot" that sets up online accounts for spammers, for example. The results of a validation operation can be communicated to the account authority service 208 for use in computing the reputation score of the online account.

When the online account is set up to access individual network services 204, each network service (e.g., the photo-sharing service 216) may provide feedback 203 via a communications network 210 to the account authority service 208 as a contribution to the online account's reputation score. As an initial matter, the action 201 of configuring an online account for access to a service initializes (a) user-to-service behavior metric(s) for that network service. The network service transmits the initial behavior metric(s) as feedback 203 via the communications network 210 in accordance with a template defined in association with the account authority service 208. The user-to-service behavior metric(s) for the network service is/are then used as an input to a reputation score computation module (not shown) that determines the contemporaneous reputation score for the online account using the new user-to-service behavior metric(s) and other metrics. Thereafter, the behavior of the online account when accessing the service can result in modifications to the user-to-service behavior metric(s), which is/are periodically transmitted as feedback 203 to the account authority service 208 via the communications network 210, so that the online account's reputation score may be updated with the most recently modified user-to-service behavior metrics.

Each network service to which the online account has access may contribute its own user-to-service behavior metrics via the communications network 210. Within an account network associated with the account authority service 208, the individual user-to-service behavior metrics may be normalized and formatted according to a template defined by the account authority service 208.

However, it should also be understood that the online account may interact with services (not shown) that are not directly associated with the account authority service 208 and represent services outside of the primary network associated with the account authority service 208 (see primary account network boundary 205). Such services of a secondary network may also contribute to an online account's reputation score, such as by sending their own service-related behavior scores to their own account authority service 209. The account authority service 209, which may compute its own reputation score, can feed a reputation score to the account authority service 208 (e.g., via feedback 207 through a communications network) for use in computing the online account's reputation score within the primary account network.

As discussed, other users 220 may also provide a feedback on an online account via the communications network 210. For example, an account authority service 208 may provide a mechanism (e.g., a special reputation reporter) for other users to report bad behavior by another user's online account via feedback 209, whether those complaining users have online accounts managed by the account authority service 208 or not. The user-to-user behavior metrics may be normalized and formatted in accordance with a template defined in association with the account authority service 208. In addition, users may also report legitimate behavior or otherwise support another user's online account (e.g., by vouching for the account) to positively influence the online account's reputation.

As discussed, other reputation reporters, such as IP reputation reporter 218, may provide feedback 211 on an online account via the communications network 210. For example, if an IP address associated with an online account is on a blacklist reported by the IP reputation reporter 218, the account's reputation score may be severely reduced.

The feedback from the various sources may be collected by the account authority service 208 and stored into a datastore (not shown) for use in computing a reputation score for the online account. Computation of the score may be performed periodically, based upon receipt of a feedback update, based upon a login request, etc.

It should be understood that an algorithm that computes the reputation score may treat any of the feedback upon which it bases the computation as time-sensitive, by providing an expiration time for the validity of such feedback or a weighting that reduces or eliminates the effect of older feedback. For example, a user-to-user behavior complaint (i.e., a complaint by a user about another user's behavior) may lose relevance over time, especially if no other similar complaints are collected since. Accordingly, the system 200 may diminish a weighting on such a complaint over time or set the complaint to expire after a time period such that it no longer influences the online account's reputation score.

In another implementation, the algorithm used to compute the reputation score may be dynamically adjusted over time to improve its accuracy. For example, a learning engine can consume feedback data from other network services, users, etc. and adjust weightings and other factors of the reputation score computation algorithm to achieve more accurate results. One example method of dynamic adjustment involves a type of validation feedback wherein training data of known good and bad users fed back into the learning engine to obtain a better fit from the reputation score computation algorithm. Based on this feedback, the learning engine adjusts weightings and/or other factors in the algorithm to provide reputation score results that are more consistent with the training data.

Figure 3:
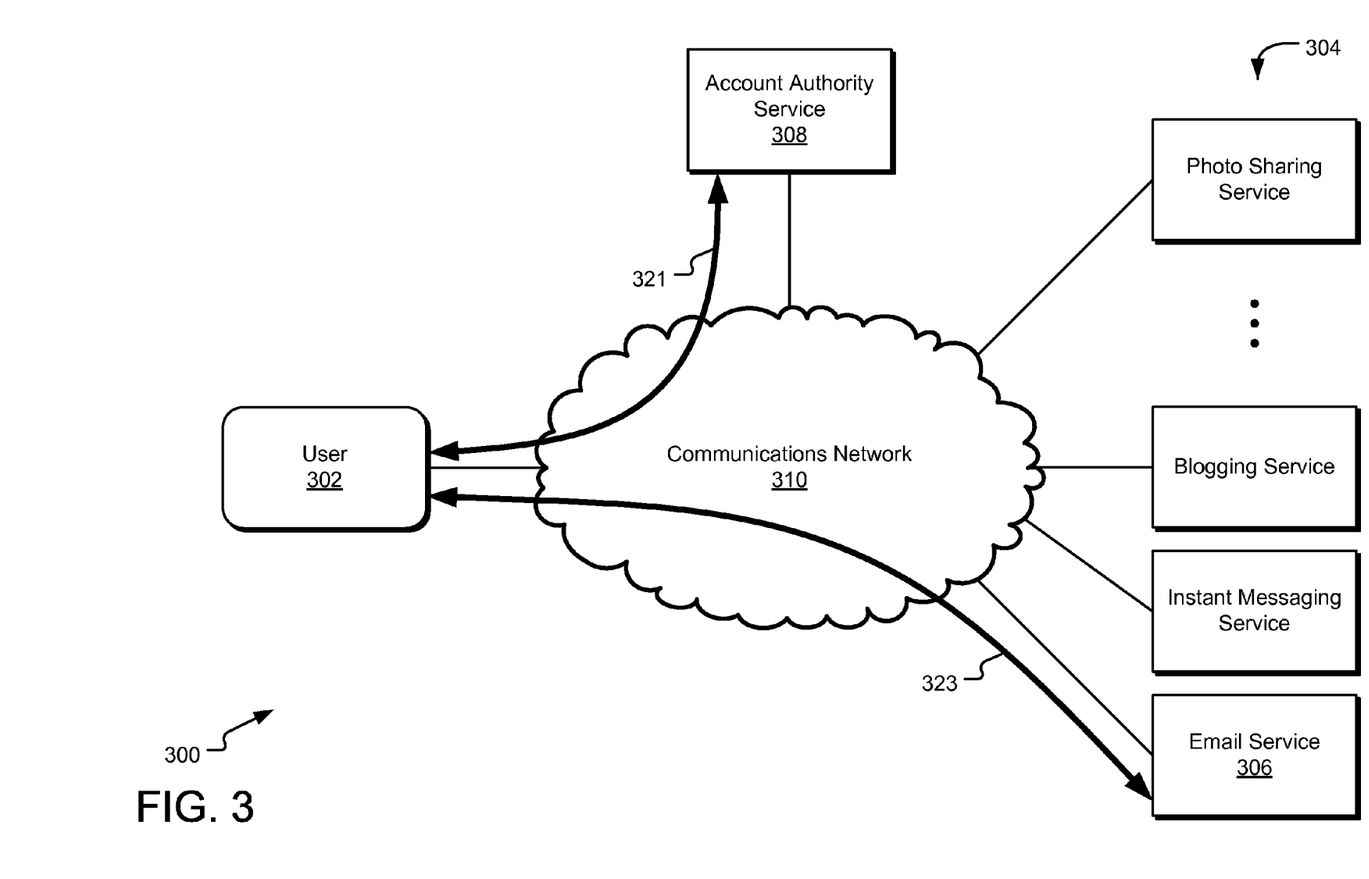
FIG. 3 illustrates an example centralized account reputation system in which a network service uses a reported reputation score associated with an account to determine a level of access provided to the online account.

FIG. 3 illustrates an example centralized account reputation system 300 in which a network service uses a reported reputation score associated with an online account to determine a level of access provided to the online account. In a typical scenario, a user 302 attempts to log into one of the network services 304, such as the email service 306, via a communications network 310. If the user 302 is not already logged into the account network associated with the account authority service 308, the email service 306 redirects the user 302 to the account authority service 308, which prompts the user for authentication information (e.g., login and password) See e.g., communications 321. In other circumstances, the user 302 may be logged into the account network and have a security token that applies to a set of network services within the account network. For example, the user may already be logged in to the account network for access to an email service in the account network and the associated security token might be valid for 8 hours and be applicable to a blogging service, an instant messaging service, and a photo-sharing service in the same account network.

In one implementation, whether or not the user 302 was already logged into the account network associated with the account authority service 308, the computer system of the user 302 receives a security token from the account authority service 308 after a successful login. The security token includes a reputation score computed for the user's online account. The reputation score may include a single overall reputation score, one or more reputation scores in different contexts, and/or input data from individual data categories relating to individual reputation factors (e.g., individual behavior metrics) that contributed to the online account's reputation scores. In this manner, if the primary factor for reducing the reputation score is unrelated or uninteresting to the network service the online account is trying to access, then the service may grant broader access than would initially be justified by the overall reputation score.

For example, the reputation score in a security token may indicate an overall reputation score of −5 on a scale of −128 to 127. However, if the primary factor in reducing the overall reputation score is a large number of emails shortly upon the initiation of the online account, a photosharing service may not deem this to be behavior that is illegitimate enough to warrant tight access restrictions within its service. In contrast, the photosharing service may consider user-to-user behavior complaints to be more important than others and therefore tighten access restrictions more than would be warranted by the overall reputation score alone. As such, the photosharing service may override the overall reputation score to make its own determination of the severity of the online account's behavior.

The user's system sends (see communications 323) the security token to the email service 306, which can use the reputation score contained therein to determine the level of access to the email service 306 that is granted to the user's online account. The user's ability to perform certain functions within the email service 306 is thereafter governed by the level of access allowed by the email service 306 based on the reputation score.

In one particular implementation, the account authority service 308 may consider the computed reputation score when deciding whether to grant the security token to the user 302. For example, if the computed reputation score is too low (e.g., below −55 based on the chart below), the account authority service 308 may refuse to grant the security token in the first place, preventing the user 302 from accessing the email service 306 at all. This approach puts a first line of defense against users with bad reputations in the hands of the account authority service 308 and avoids the need for the individual network services to make a decision about restricting access to such users.

In addition, the security policies for individual network services may state that accounts with a computed reputation score below a certain threshold should not be issued a security token for their specific services. In such circumstances, an account authority service would follow the network service's security policy and only issue security tokens to the network service if the account's computed reputation score exceeds the threshold.

In one implementation, the email service 306 follows a template set forth below, although it should be understood that other templates may be employed.

| Reputation Score Range | Suggested Classification | Suggested Privilege Level |
|---|---|---|
| >60 | Great Account | No restrictions |
| 15 to 60 | Good Account | Reading and writing with some restrictions |
| 0 to 15 | OK Account | Read only |
| −55 to −1 | Suspicious Account | Restrict access and monitor closely |
| <−55 | Spammer's Account | Severely restrict access or completely block |

The specific levels of access allowed by a network service to an online account in any one of the classes above are determined based on the particular characteristics of network service. For example, in a "Good Account" class, an email service may limit one or both of distribution list size and number of emails sent during a specified time period, depending on the type of illegitimate behavior the service expects to experience from an online account in that class. The level of access may also vary within a specific class, based upon the specific reputation score within the class range and/or upon the data categories relating to individual behavior factors that contributed to the reputation score.

One or more templates may also be defined for feedback from various data sources. For example, a template may define a common data format with which network services may communicate with the account authority service when providing feedback on an online account. The feedback may also be normalized according to account authority service requirements. In this manner, different types of feedback may be provided to the account authority service in comparable ranges and severities.

Any network service may have its own guidelines for mapping an overall reputation score and/or reputation context scores (collectively "reputation score") to a specific level of access. In one implementation, the guidelines may be set up to provide broad access to online accounts associated with a high reputation score, because those online accounts are believed to be legitimate. In contrast, the guidelines may provide limited access, designed to discourage spamming and other illegitimate service usage, to online accounts associated with a low reputation score. Some examples of restricting access for lower reputations scores are given below:

| Type of Network Service | Restricted Access |
|---|---|
| Any Network Service | Require solution of a human interactive proof (HIP) in order to increase the level of access to the network service |
| Any Network Service | Require SMS (Short Message Service) validation in order to increase the level of access to the network service |
| Any Network Service | Require validation using a trusted device ID in order to increase the level of access to the network service |
| Any Network Service | Limit the number of accounts authorized from a particular computing device |
| Email Service | Restrict number of emails sent during a specified period of time |
| Email Service | Restrict number of destination addresses per email |

| Type of Network Service | Restricted Access |
|---|---|
| Blogging Service | Restrict the number of blog entries during a specific period of time |
| Blogging Service | Restrict blog entries to small communities only |
| Blogging Service | Limit to read only access |

It should be understood that the restrictions above, and others, may be applied in combination depending on the security policies of a network service and the reputation score (and its context and contributing data categories) of the online account.

Figure 4:
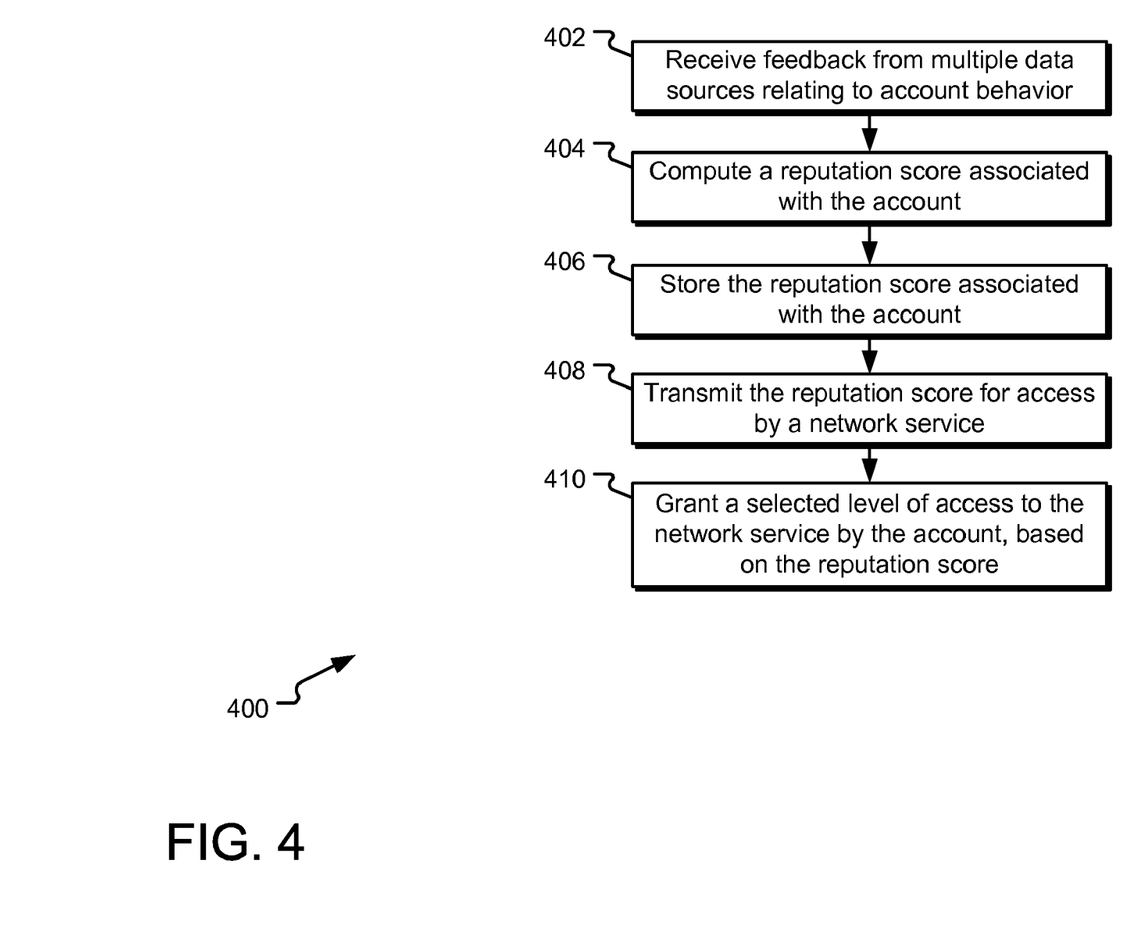
FIG. 4 illustrates example operations for computing and reporting a reputation score in a centralized account reputation system.

FIG. 4 illustrates example operations 400 for computing and reporting a reputation score in a centralized account reputation system. A feedback operation 402 receives feedback from multiple data sources, including one or more of the following: network services, other users, reputation reporters, and validation operations. Various other examples of data sources may include account information (e.g., is the account paid, is there a trusted device ID associated with the user login, etc.?). The feedback includes metrics related to behavior of the online account, including potentially providing information about the online account's user, whether through an account authority service or other means; interacting with one or more networks services; interacting with one or more users; validating a device or user; etc.

In one implementation, the account authority service defines a normalized scale and a template (e.g., providing a standardized format) for feedback to allow multiple data sources to contribute to the reputation score associated with an online account. For example, all feedback may be normalized into a range of −128 to 127. Furthermore, the feedback of a negative behavior in one network service (e.g., excessive emails) may be normalized to be relatively equivalent to the feedback of a comparably negative behavior in another network service (e.g., initiation of excessive instant messaging sessions).

Likewise, the template can standardize the format in which feedback data is provided to the account authority service. In one implementation, the feedback includes an online account identifier and a feedback metric particular to the entity providing the feedback (e.g., a network service, a reputation reporter, a user, etc.). In other implementations, the feedback may include an online account identifier and metrics in multiple data categories relating to the individual behaviors or types of behaviors of the online account. For example, for an overall reputation score in the range of −100 to +100, data in the data category "SPAM" may contribute from −100 to −50 while data in the data category "GOOD" may contribute in the range of +20 to +60. Based on an additive computation formula, if the account received data totaling +30 in the "GOOD" data category and data totaling −90 in the "SPAM" data category, an online account may be given an reputation score of −60. A network service could then evaluate the overall reputation score of −60, as well as the constituent details from the data categories, to determine the level of access granted to the network service.

A computing operation 404 uses received feedback information to compute a reputation score. In one implementation, the reputation score is intended to predict whether an online account is a legitimate online account (e.g., for a rule-abiding user) or illegitimate online account (e.g., for a spammer). In addition, as discussed, the reputation score may include input data from different data categories relating to individual reputation factors, thereby allowing a network service to make a finer grained analysis of the online account's reputation and therefore the online account's likelihood of being legitimate or illegitimate.

In one implementation, a storing operation 406 stores the reputation score and feedback metrics in association with the online account for future access. For example, the user associated with an online account may attempt to access a blogging service after accessing an email service. In various examples, the reputation score can be retrieved from the datastore to be sent in a security token to the blogging service, retrieved via a SOAP interface, etc. In alternative implementations, the reputation score may be computed in real-time upon each online account attempt to access a network service. It should also be understood that the feedback data may be continually updated based on new feedback received from data sources.

A transmission operation 408 transmits the reputation score for access by the network service. In one implementation, the reputation score is transmitted by the account authority service to the user's computer via a security token. The user's computer then forwards the security token to the desired network service for access to the service. In another implementation, the account authority service sends the reputation score directly to the desired network service, either by request from the network service or of its own accord.

A granting operation 410 grants the online account with a selected level of access to the network service, based on the reputation score. As previously discussed, each network service can interpret the reputation score according to account authority-defined templates to determine a level of access that it will grant to the online account. In an alternative implementation, each network service can supplement or override the account authority-defined templates to determine the level of access it will grant to the online account.

In yet another implementation, a network service may request an updated reputation score after a period of time to broaden or narrow the level of access granted to the user based on any updates to the reputation score. For example, initially an online account's reputation score may not be high enough to warrant the transmission of high volumes of email. However, after 12 hours of good behavior in the email service or other network services, the email service may request an update to the reputation score, which may have been improved during the 12 hours of use by the good behavior. Upon receipt of the improved reputation score, the email service can loosen its restrictions on the online account to allow larger volumes of email transmission.

It should also be understood that network service access may be adjusted dynamically based on a reputation score change, independently of a previously issued and valid security token. One circumstance in which such adjustment may be made is when a change to feedback about the user account (e.g., user-to-user, user-to-service, etc.) changes after a security token has been issued and is still valid. If that feedback results in a transition from one classification to another (e.g., from Suspicious Account to OK Account), notice of the transition can be communicated from the account authority service to the network service. The notice may merely indicate a transition to a new classification or it may indicate an adjustment to the reputation score received in the security token. For example, the notice may send an adjustment (e.g., plus or minus X from the earlier reputation score) or the notice may send a replacement reputation score. In response to the notice, the network service can then alter the level of access granted to the user 302 based on the notice.

In yet another implementation, the account authority service may issue multiple reputation scores in different contexts, which may be employed to characterize the reputation of an online account. Different contexts relate to different views of the online account—one network service may have a different sense of what a "good" account is than another network service because of differences in the natures of the different network services. For example, feedback from a single data source may contribute more (e.g., be more heavily weighted) when applied to a reputation score of one context than to another. Alternatively, data from a data source may not contribute anything to a reputation score of one context, depending on the nature of that context. Accordingly, the reputation score computation algorithm in each context may place different emphases or weights on feedback from different feedback data sources, such that different reputation scores are computed in each context.

Contexts differ from data categories in that contexts represent different versions of the reputation score (as computed by different reputation score computation algorithms or weightings) whereas data categories represent different sets of input data that contribute to the reputation score in various contexts.

As an example of an application of different reputation context scores, an online account might have one reputation score in the context of "CONTENT" and a different reputation score in the context of "SPAM". Accordingly, depending on the network service evaluating a reputation score, being a "bad" user in the context of "CONTENT" may be viewed as quite different from being a "bad" user in the context of "SPAM". For example, a bad reputation in the "CONTENT" context may not be worth restricting access to an email service but it may be worth restricting access to a blogging service. In contrast, a bad reputation in the "SPAM" context may be worth restricting access to both services. In this circumstance, a network service may selectively rely on a reputation score from one or more discrete contexts in order to make its determination of the level of access to provide to an online account.

Figure 5:
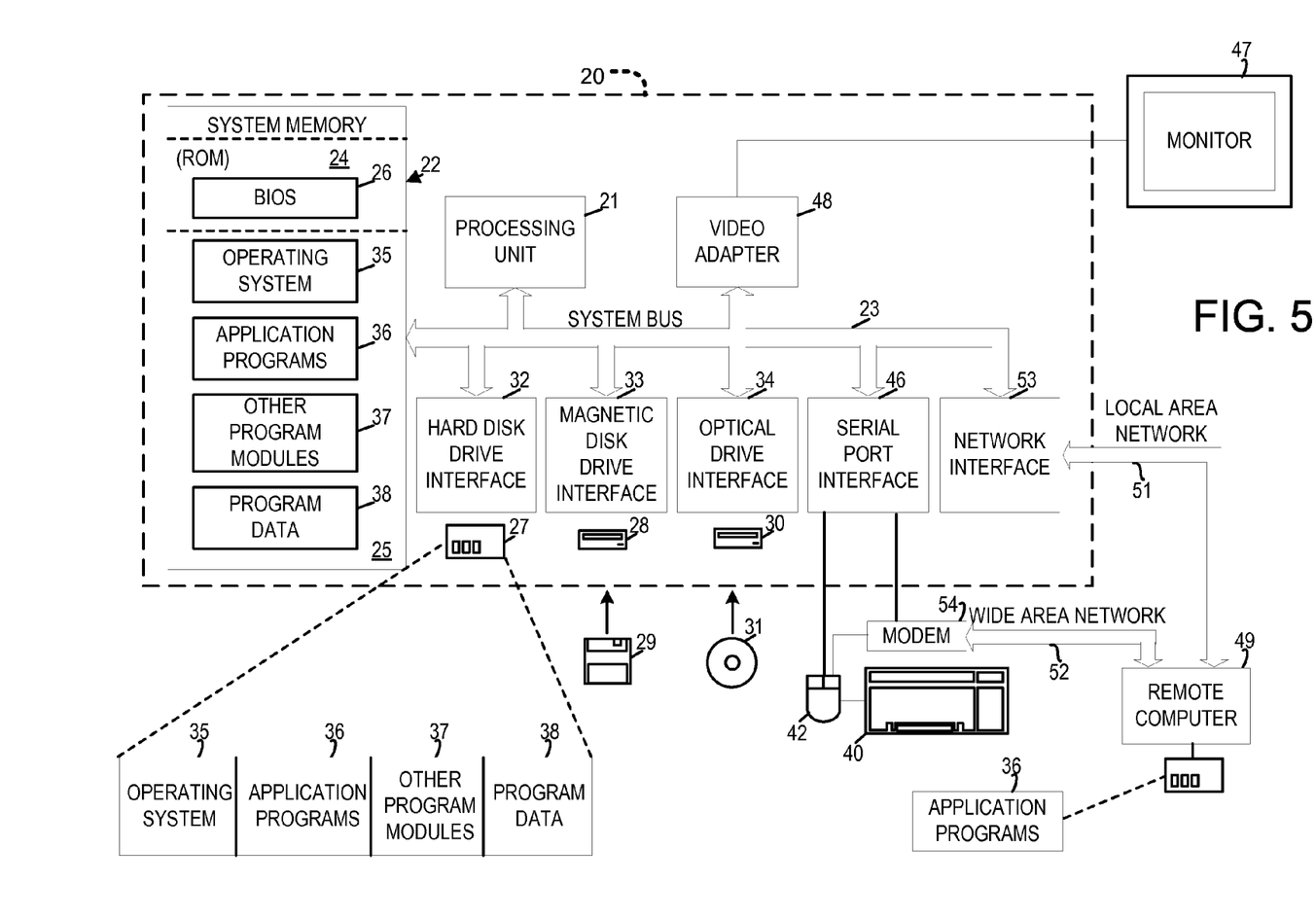
FIG. 5 illustrates an example system that may be useful in implementing the described technology.

The example hardware and operating environment of FIG. 5 for implementing the invention includes a computing device, such as general purpose computing device in the form of a gaming console or computer 20, a mobile telephone, a personal data assistant (PDA), a set top box, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via a display interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an account authority service module, a network module, a reputation reporter module, and other modules may be embodied by instructions stored in memory 22 and/or storage devices 29 or 31 and processed by the processing unit 21. Feedback data, reputation score data including reputation scores, metrics, security tokens, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of reporting a reputation of an online account used to access a network service, the method comprising:
    collecting feedback from a plurality of network services, the feedback including user-to-service metrics relating to behavior of the online account with each of the network services;
    computing a reputation associated with the online account as a weighted combination of the collected feedback from the plurality of network services and one or more additional sources of reputation data, the reputation including multiple different reputation scores associated with different contexts computed by applying different respective weightings to the collected feedback and the one or more additional sources of reputation data for the different contexts to form different versions of the reputation for use in the different contexts;
    transmitting the computed reputation for use by the network service in granting access to the network service as a token that includes the multiple different reputation scores associated with different contexts as different versions of the reputation selectable by the network service.

2. The method of claim 1 wherein the reputation is a factor in determining a level of access granted by the network service to the online account.

3. The method of claim 1 wherein the reputation is a factor in determining a level of access granted by the network service to the online account, the determined level of access limiting functionality of the network service available to the online account.

4. The method of claim 1 wherein the feedback includes a user-to-user behavior metric relating to interaction by the online account with a user of another account.

5. The method of claim 1 wherein the feedback includes a reputation reporter metric relating to an indicator of a level of legitimacy of the online account detected by a reputation reporter.

6. The method of claim 1 wherein the feedback includes a validation metric relating to a response by a user to a validation prompt.

7. The method of claim 1 wherein at least one element of the feedback is time-sensitive.

8. The method of claim 1 wherein at least one element of the feedback is time-sensitive, the at least one element being subject to expiration after a period of time subsequent to collection of the at least one element in the collecting operation.

9. The method of claim 1 wherein at least one element of the feedback is time-sensitive, the at least one element decreasing in its influence on the reputation score after a period of time subsequent to collection of the at least one element in the collecting operation.

10. A computer-readable storage medium excluding a signal per se having computer-executable instructions for performing a computer process that reports a reputation of an online account used to access a network service, the computer process comprising:
    collecting feedback from a plurality of network services, the feedback including user-to-service metrics relating to behavior of the online account with each of the network services;
    computing the reputation associated with the online account by weighting the collected feedback and one or more additional sources of reputation data differently for different contexts to obtain multiple reputation scores corresponding to the different contexts as different versions of the reputation;
    transmitting the computed reputation including the multiple reputation scores for use by the network service in granting access to the network service, the network service configured to selectively use one or more of the multiple reputation scores to determine a level of access provided by the network service to the online account.

11. The computer-readable storage medium of claim 10 wherein the determined level of access limiting functionality of the network service available to the online account.

12. The computer-readable storage medium of claim 10 wherein the feedback includes a user-to-user behavior metric relating to interaction by the account with a user of another account.

13. The computer-readable storage medium of claim 10 wherein the feedback includes a reputation reporter metric relating to an indicator of a level of legitimacy of the online account detected by a reputation reporter.

14. The computer-readable storage medium of claim 10 wherein at least one element of the feedback is time-sensitive.

15. A method of operating a network service, the method comprising:
- receiving a token containing multiple reputation scores associated with an online account for different contexts, the reputation scores being computed for the different contexts by applying different weightings to feedback collected from a plurality of network services and one or more additional reputation sources with which the account has interacted to form different versions of a reputation corresponding to the different contexts, the collected feedback including user-to-service metrics relating to behavior of the online account with each of the network services;
- selecting one or more of the reputation scores from the multiple reputation scores contained as the different versions in the token as a factor for controlling access to the network service;
- configuring a level of access to the network service by the online account, the configured level of access varying based on the one or more reputation scores from the multiple reputation scores that are selected.

16. The method of claim 15 wherein the multiple reputation scores are computed based on a user-to-user behavior metric relating to interaction by the account with a user of another account.

17. The method of claim 15 wherein the multiple reputation scores are computed based on a reputation reporter metric relating to an indicator of a level of legitimacy of the online account detected by a reputation reporter.

18. The method of claim 15 wherein the feedback includes a validation metric relating to a response by a user to a validation prompt.

19. The method of claim 15 wherein the configured level of access limits functionality of the network service available to the online account.

* * * * *